US009010978B2

(12) United States Patent
Kwo

(10) Patent No.: US 9,010,978 B2
(45) Date of Patent: Apr. 21, 2015

(54) LIGHT OUTPUTTING APPARATUS

(71) Applicant: All Real Technology Co., Ltd., Kaohsiung (TW)

(72) Inventor: Jon-Lian Kwo, Kaohsiung (TW)

(73) Assignee: All Real Technology Co., Ltd., Kaohsiung (TW)

( * ) Notice: Subject to any disclaimer, the term of this patent is extended or adjusted under 35 U.S.C. 154(b) by 335 days.

(21) Appl. No.: 13/756,924

(22) Filed: Feb. 1, 2013

(65) Prior Publication Data

US 2013/0201716 A1    Aug. 8, 2013

(30) Foreign Application Priority Data

Feb. 6, 2012    (TW) .............................. 101103807 A

(51) Int. Cl.
  *G02B 6/04* (2006.01)
  *G02B 6/42* (2006.01)
  *H02S 50/10* (2014.01)
  *G01R 31/40* (2014.01)
(52) U.S. Cl.
  CPC .............. *G02B 6/04* (2013.01); *G02B 6/4298* (2013.01); *H02S 50/00* (2013.01); *H02S 50/10* (2014.12)

(58) Field of Classification Search
  CPC ......... G02B 6/04; G02B 6/4298; H02S 50/10
  USPC .................................. 362/554, 556
  See application file for complete search history.

(56) References Cited

U.S. PATENT DOCUMENTS 5,550,946 A * 8/1996 Muehlemann et al. ....... 385/121
2003/0169502 A1* 9/2003 Ogura ........................... 359/618

* cited by examiner

*Primary Examiner* — David V Bruce
(74) *Attorney, Agent, or Firm* — WPAT, P.C.; Anthony King; Kay Yang

(57) ABSTRACT

The present invention relates to a light outputting apparatus, which includes at least one light source, a light guiding apparatus and a platform. The light source is used for providing light beams. The light guiding apparatus has at least one input end and an output end. The input end corresponds to the light source, and includes a plurality of optical fibers. The optical fibers of the input end extend to the output end, and are distributed uniformly at the output end. The light beams from the output end illuminate a module to be tested on the platform. Whereby, the entire uniformity of the output light of the output end is enhanced.

9 Claims, 6 Drawing Sheets

FIG. 4

LIGHT OUTPUTTING APPARATUS

BACKGROUND OF THE INVENTION

1. Field of the Invention

The present invention relates to a light outputting apparatus, and in particular, to a light outputting apparatus that guides light through optical fibers.

2. Description of the Related Art

A conventional light outputting apparatus is used for testing a solar cell module and usually includes a plurality of light sources and a platform. The platform bears the solar cell module. The light sources are arranged in an array and used for providing light beams of simulated sunlight so as to illuminate the solar cell module, thereby achieving the test objective.

The conventional light outputting apparatus has the following defects: the light sources directly illuminate the solar cell module, so when the luminance of the light sources is not uniform (some light sources are especially bright or especially dim), the light beams projected on the solar cell module are not uniform as a whole (some regions are especially bright or especially dim), which seriously affects the test result. Especially, when a light source is replaced, the above problem becomes more obvious. Besides, relative positions of the light sources also have an impact on the uniformity of the light beams as a whole, so the positions of the light sources should be very precise. Especially, when the position of a light source is adjusted separately, the entire uniformity of the light beams as a whole is easily affected. Therefore, the conventional light outputting apparatus has a high requirement for the setting or adjustment of the light sources, leading to difficulties in the setting or adjustment.

SUMMARY OF THE INVENTION

The present invention provides a light outputting apparatus, which includes at least one light source, a light guiding apparatus and a platform. The light source is used for providing light beams. The light guiding apparatus has at least one input end and an output end. The input end corresponds to the light source, and includes a plurality of optical fibers. The optical fibers of the input end extend to the output end, and are distributed uniformly at the output end. The platform is used for bearing a module to be tested, and the light beams from the output end illuminate the module to be tested.

Hence, the entire uniformity of the output light at the output end is improved. Moreover, in the case of a plurality of light sources with nonuniform luminance (some light sources are especially bright or especially dim), the entire uniformity of the output light of the output end is not severely affected. Besides, relative positions of the light sources do not affect the entire uniformity of the output light of the output end at all. Therefore, the light outputting apparatus does not have a high requirement for the setting or adjustment of the light source, hence improving the convenience of use. In addition, the output end of the light outputting apparatus in the present invention can be dynamically moved to the adjacency of the module to be tested according to a user requirement, so as to reduce the loss of illuminance, thereby being more efficient than the prior art in which the solar cell module is required to be matched with the positions of the light sources.

BRIEF DESCRIPTION OF THE DRAWINGS

The invention will be described according to the appended drawings in which:

FIG. 4 is a sectional schematic view taking along the line 4-4 of an embodiment of a third input end of the light guiding apparatus in FIG. 1;

PREFERRED EMBODIMENT OF THE PRESENT INVENTION

Figure 1:
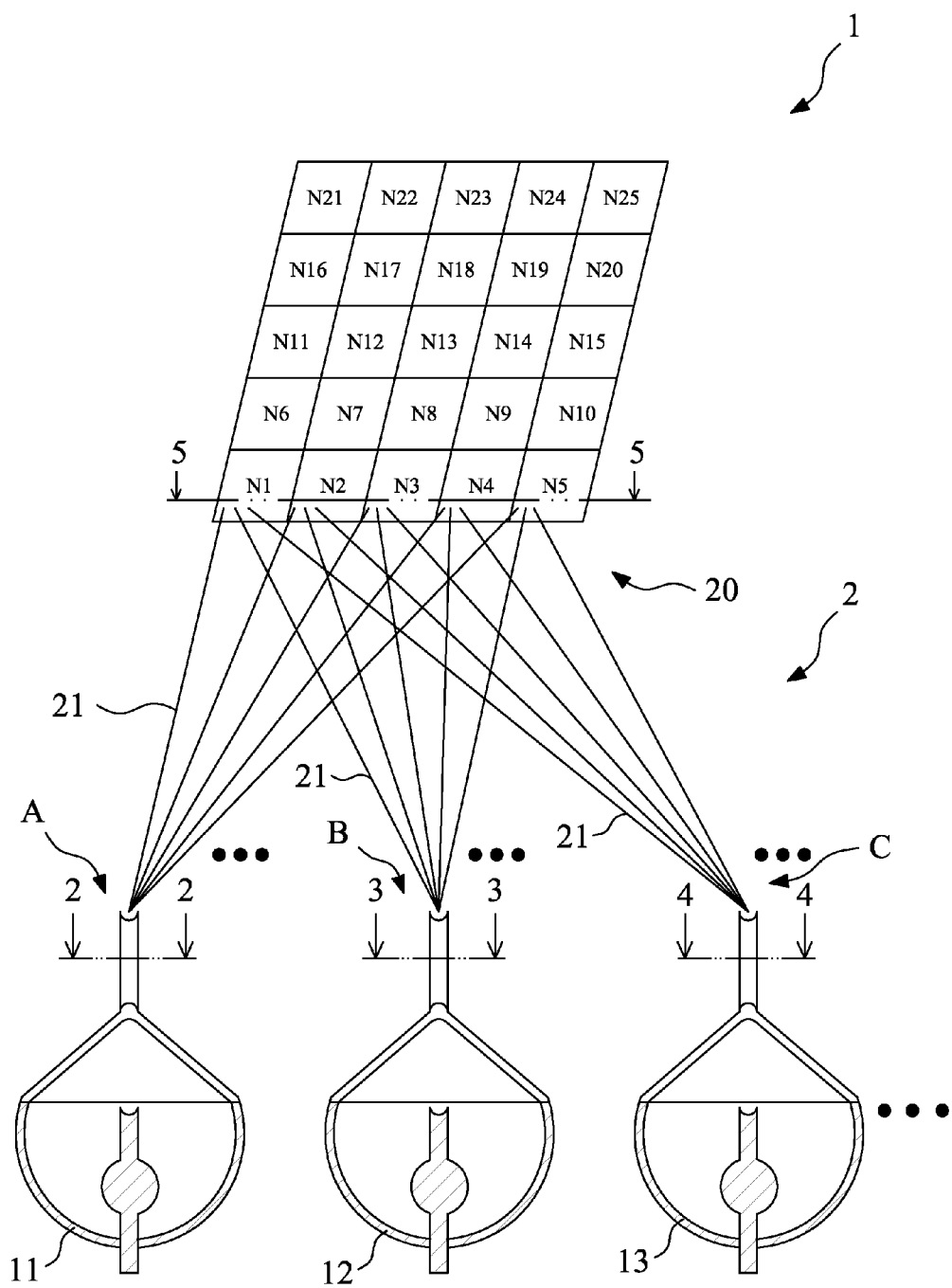
FIG. 1 is a schematic view of a light outputting apparatus according to an embodiment of the present invention.

Referring to FIG. 1, a schematic view of a light outputting apparatus according to an embodiment of the present invention is illustrated. The light outputting apparatus 1 comprises at least one light source, a light guiding apparatus 2 and a platform (not shown).

The light source is used for providing light beams. In this embodiment, the at least one light source includes a first light source 11, a second light source 12 and a third light source 13. However, it can be understood that, the at least one light source may include more than three light sources. The light sources 11, 12 and 13 are in a stable state or a transient state, and can also be gas discharge lamps or metal discharge lamps. In this embodiment, the light sources 11, 12 and 13 are xenon lamps.

The light guiding apparatus 2 has at least one input end and an output end 20. In this embodiment, the light guiding apparatus 2 includes a plurality of input ends (for example, a first input end A, a second input end B, and a third input end C) and a plurality of optical fibers 21. Each optical fiber 21 extends from one of the input ends to the output end 20. In other words, each input end is a bundle of optical fibers, the output end 20 is a bundle of optical fibers, and the number of optical fibers of the output end 20 is equal to the sum of the number of optical fibers of the input ends (the first input end A, the second input end B and the third input end C). In this embodiment, the output end 20 may be divided into N regions (N=25) (region N1, region N2, . . . , and region N25).

Each input end corresponds to each light source. For example, the first input end A collects light beams of the first light source 11; the second input end B collects light beams of the second light source 12; and the third input end C collects light beams of the third light source 13. Each input end includes a plurality of optical fibers 21. The optical fibers 21 of each input end extend to the output end 20, and are distributed uniformly at the output end 20. In this embodiment, the light guiding apparatus 2 has three input ends A, B and C corresponding to the light sources 11, 12 and 13. However, it can be understood that, if the at least one light source includes more than tree light sources, the light guiding apparatus 2 may have more than three input ends corresponding thereto.

Figure 2:
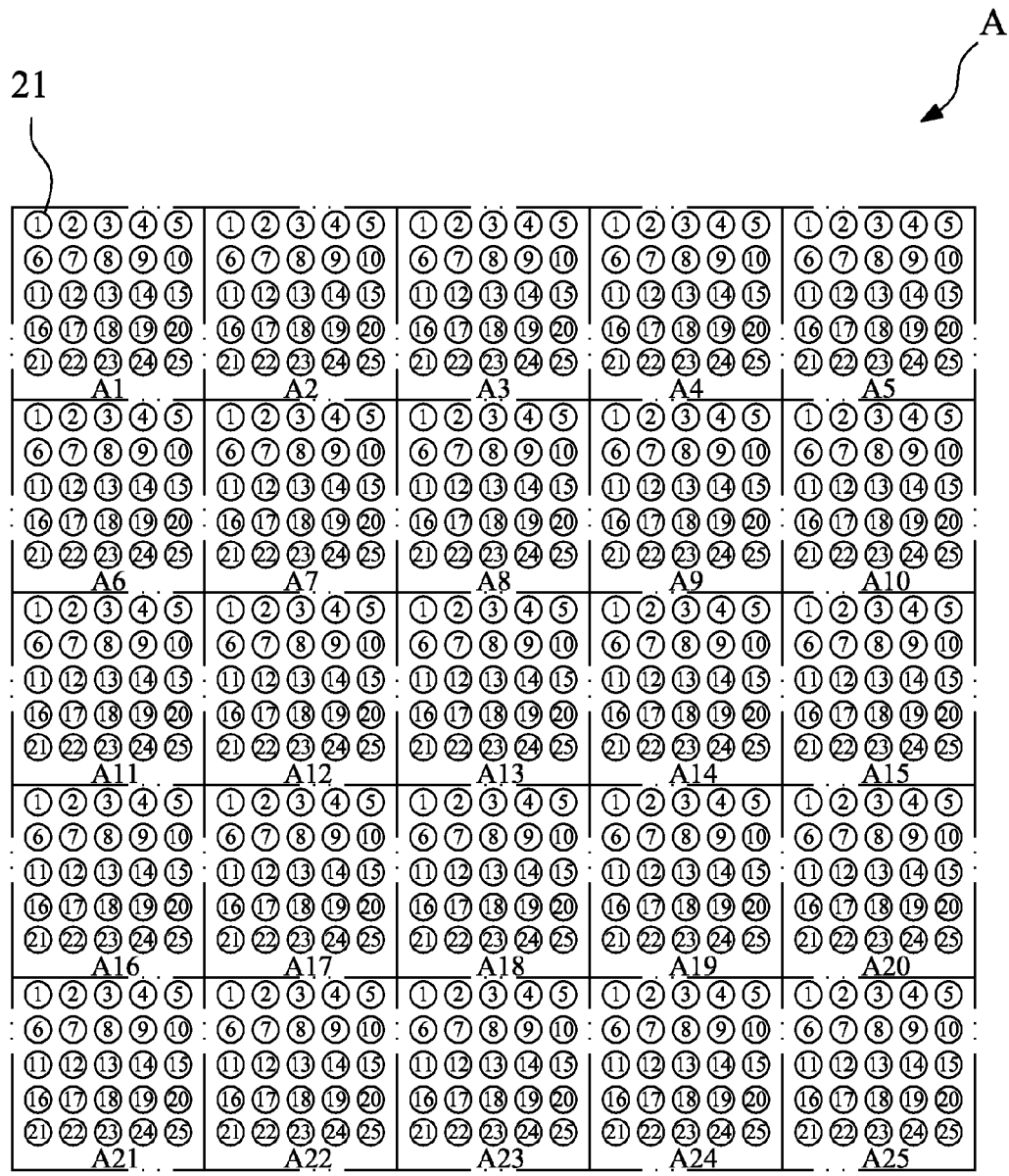
FIG. 2 is a schematic sectional view taking along the line 2-2 of an embodiment of a first input end of the light guiding apparatus in FIG. 1.

Referring to FIG. 2, a schematic sectional view taking along the line 2-2 of an embodiment of a first input end of the light guiding apparatus in FIG. 1 is illustrated. The first input end A may be divided into M regions. Each region has N optical fibers 21. In this embodiment, M=25, and N=25. That is, the first input end A may be divided into 25 regions (the region A1, region A2, . . . , and region A25). Each region has 25 optical fibers 21 (for example, the region A1 has 25 optical fibers 21 numbered from 1 to 25), so the first input end A has a total of 625 optical fibers 21 (25×25=625). However, it can be understood that, in other embodiment, the value of M may be not equal to the value of N.

The optical fibers 21 of each region respectively extend to the N regions of the output end 20. For example, in the region A1, the optical fiber 21 numbered 1 extends to the region N1 of the output end 20, the optical fiber 21 numbered 2 extends to the region N2 of the output end 20, ..., and the optical fiber 21 numbered 25 extends to the region N25 of the output end 20. In the same manner, in the region A2, the optical fiber 21 numbered 1 extends to the region N1 of the output end 20, the optical fiber 21 numbered 2 extends to the region N2 of the output end 20, ..., and the optical fiber 21 numbered 25 extends to the region N25 of the output end 20. In the same manner, in the region A25, the optical fiber 21 numbered 1 extends to the region N1 of the output end 20, the optical fiber 21 numbered 2 extends to the region N2 of the output end 20, ..., and the optical fiber 21 numbered 25 extends to the region N25 of the output end 20.

Figure 3:
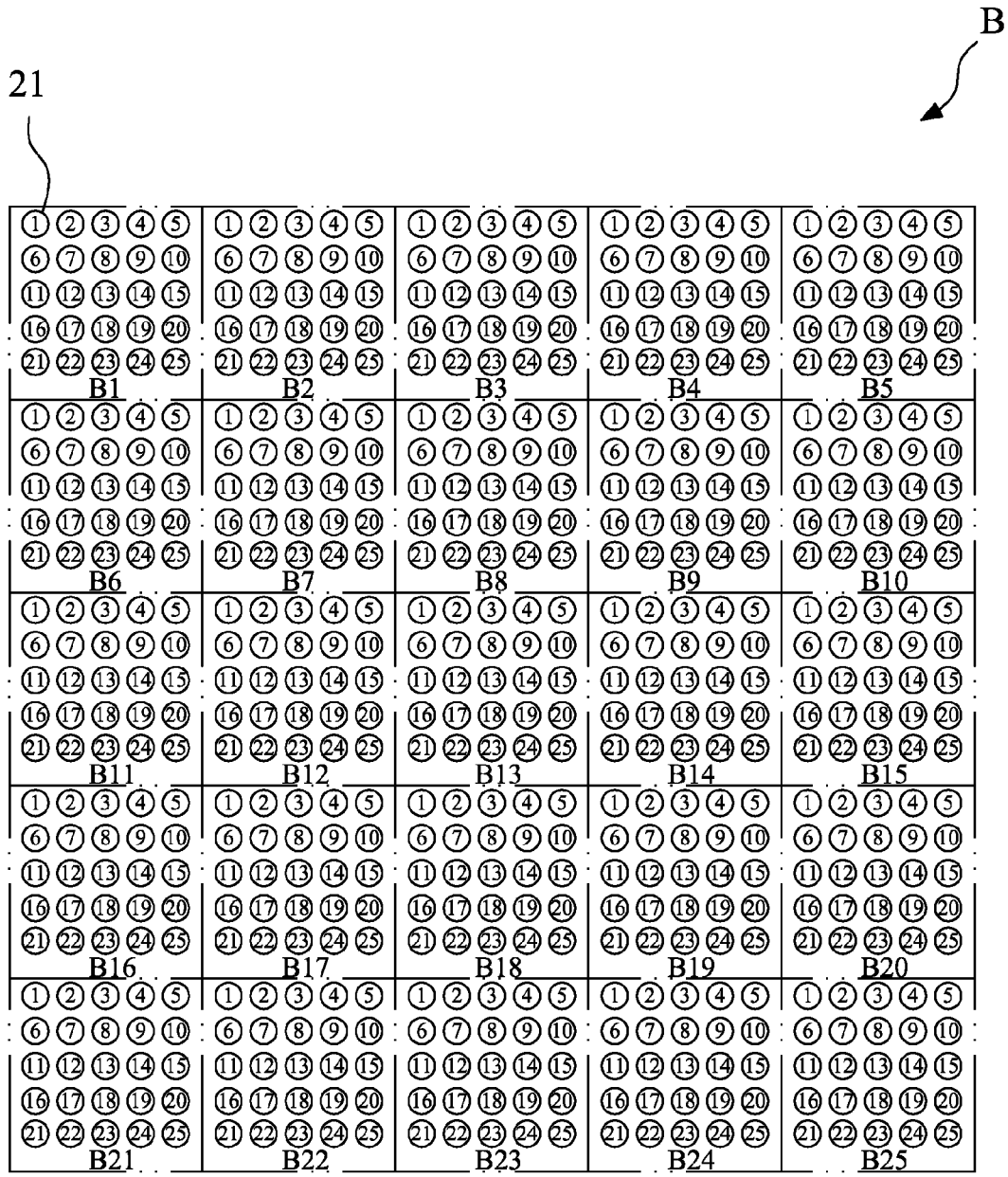
FIG. 3 is a schematic sectional view taking along the line 3-3 of an embodiment of a second input end of the light guiding apparatus in FIG. 1.

Referring to FIG. 3, a schematic sectional view taking along the line 3-3 of an embodiment of a second input end of the light guiding apparatus in FIG. 1 is illustrated. The second input end B has the same form as the first input end A, and may be divided into M regions. Each region has N optical fibers 21. In this embodiment, M=25, and N=25. That is, the second input end B may be divided into 25 regions (the region B1, region B2, ..., and region B25). Each region has 25 optical fibers 21 (for example, the region B1 has 25 optical fibers 21 numbered from 1 to 25). Therefore, the second input end B has a total of 625 optical fibers 21 (25×25=625). The optical fibers 21 of each region respectively extend to the N regions of the output end 20. For example, in the region B1, the optical fiber 21 numbered 1 extends to the region N1 of the output end 20, the optical fiber 21 numbered 2 extends to the region N2 of the output end 20, ..., and the optical fiber 21 numbered 25 extends to the region N25 of the output end 20. In the same manner, in the region B2, the optical fiber 21 numbered 1 extends to the region N1 of the output end 20, the optical fiber 21 numbered 2 extends to the region N2 of the output end 20, ..., and the optical fiber 21 numbered 25 extends to the region N25 of the output end 20. In the same manner, in the region B25, the optical fiber 21 numbered 1 extends to the region N1 of the output end 20, the optical fiber 21 numbered 2 extends to the region N2 of the output end 20, ..., and the optical fiber 21 numbered 25 extends to the region N25 of the output end 20.

Figure 4:
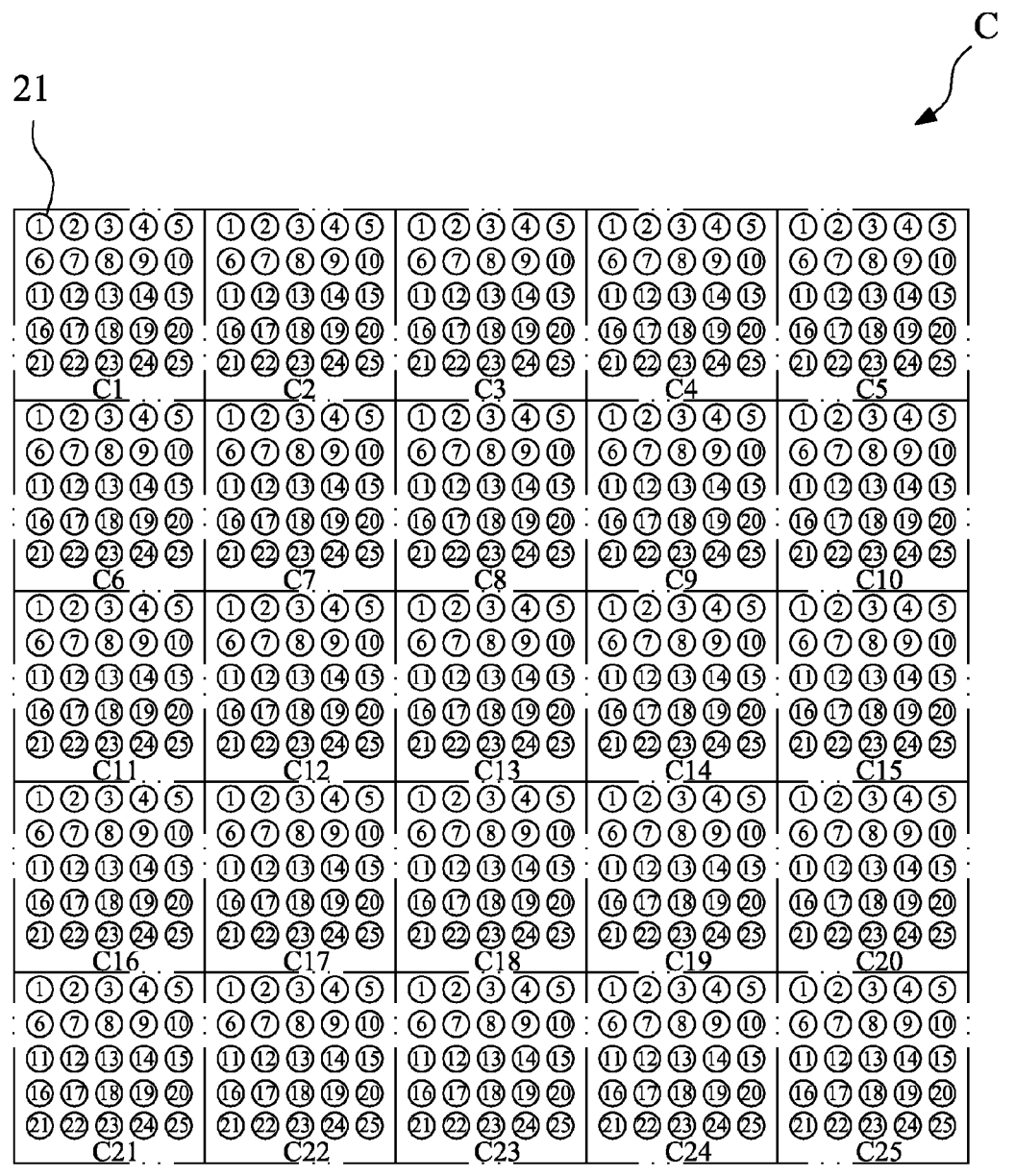

Referring to FIG. 4, a sectional schematic view taking along the line 4-4 of an embodiment of a third input end of the light guiding apparatus in FIG. 1 is illustrated. The third input end C has the same form as the first input end A and the second input end B, and is not described herein again.

Figure 5:
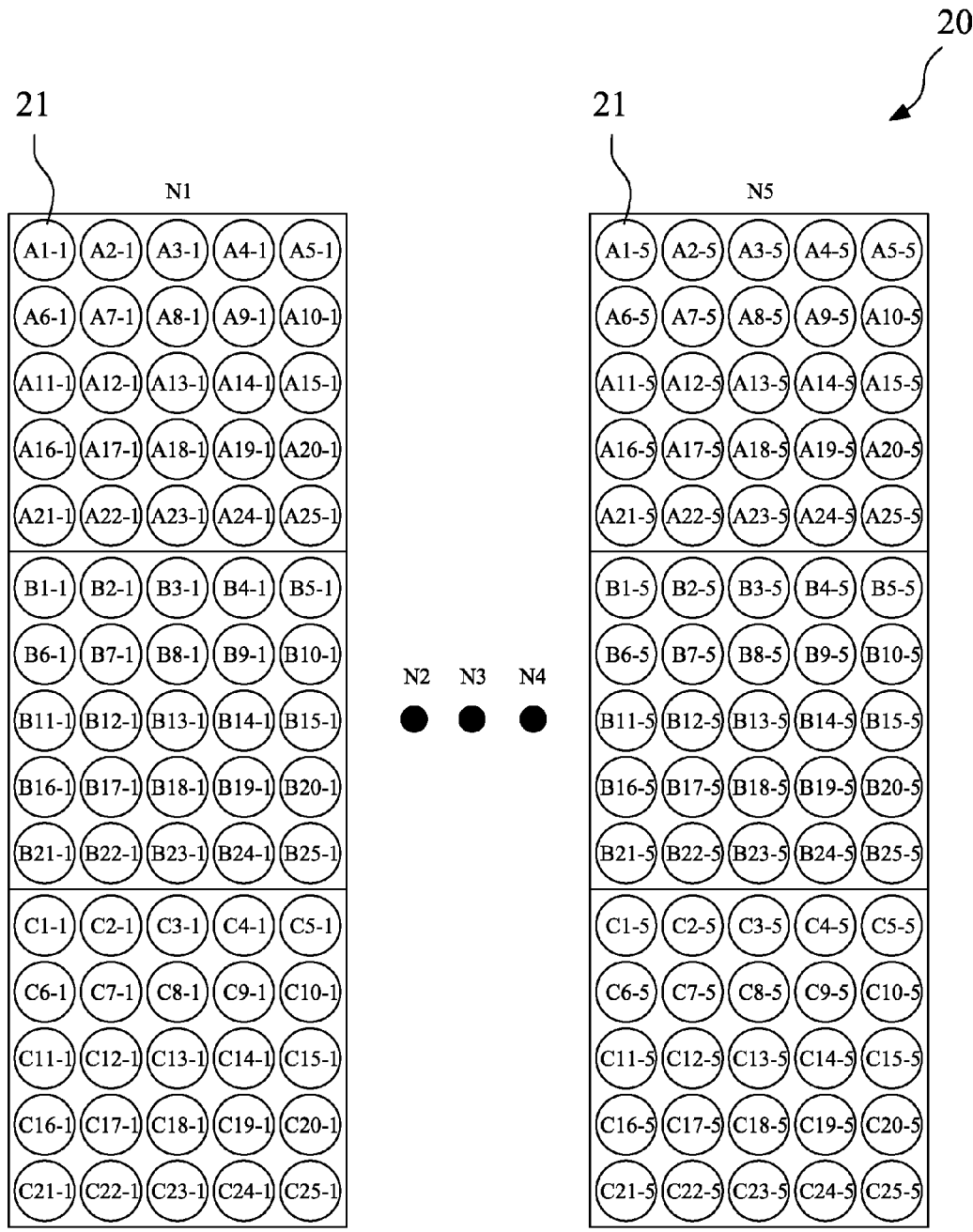
FIG. 5 is a partial schematic view of an embodiment of an output end of the light guiding apparatus in FIG. 1.

Referring to FIG. 5, a partial schematic view of an embodiment of an output end of the light guiding apparatus in FIG. 1 is illustrated. The output end 20 may be divided into 25 regions (the region N1, region N2, ..., and region N25). Each region includes optical fibers 21 from the input ends. For example, the region N1 includes the optical fiber 21 numbered 1 from the region A1 of the first input end A (No. A1-1), the optical fiber 21 numbered 1 from the region A2 of the first input end A (No. A2-1), ..., the optical fiber 21 numbered 1 from the region A25 of the first input end A (No. A25-1); the optical fiber 21 numbered 1 from the region B1 of the second input end B (No. B1-1), the optical fiber 21 numbered 1 from the region B2 of the second input end B (No. B2-1), ..., and the optical fiber 21 numbered 1 from the region B25 of the second input end B (No. B25-1); and the optical fiber 21 numbered 1 from the region C1 of the third input end C (No. C1-1), the optical fiber 21 numbered 1 from the region C2 of the third input end C (No. C2-1), ..., and the optical fiber 21 numbered 1 from the region C25 of the third input end C (No. C25-1). Therefore, the region N1 has a total of 75 optical fibers 21 (25×3=75). In the same manner, the distribution in the region N2 to the region N25 is the same as that in the region N1. Therefore, the output end 20 has a total of 1875 optical fibers 21 (25×75=1875). On the other hand, from the view of the light sources, each input end is divided into 25 regions, and each region has 25 optical fibers 21, so the total number 21 is also 1875 (25×25×3=1875).

The platform is used for bearing a module to be tested (not shown). Preferably, the module to be tested is a solar cell module. All the optical fibers 21 of the output end 20 are bundled together to align with the module to be tested, so that light beams from the output end 20 illuminate the module to be tested to perform the test.

Figure 6:
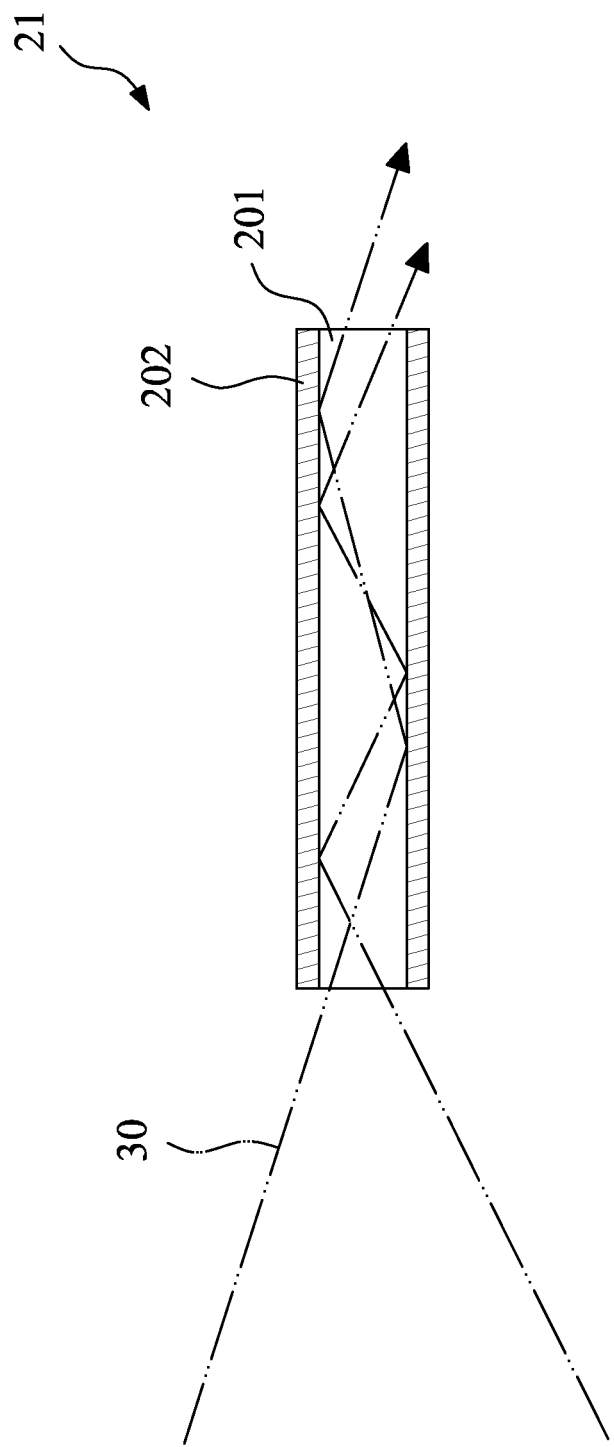
FIG. 6 is a schematic view of an embodiment of an optical fiber of the light guiding apparatus in FIG. 1.

Referring to FIG. 6, a schematic view of an embodiment of an optical fiber of the light guiding apparatus in FIG. 1 is illustrated. The optical fiber 21 has a core part 201 and a cladding part 202. The cladding part 202 covers the core part 201. In this embodiment, the material of the core part 201 comprises silicon (for example, silicon dioxide), and the material of the cladding part 202 is glass or plastic. The refraction index of the cladding part 202 is less than that of the core part 201, so that a light beam 30 is totally reflected on the optical fiber 21, thereby effectively reducing the transmission loss of light beams.

In this embodiment, each input end may be divided into M regions, and each region has N optical fibers 21. However, in other embodiments, each input end is not divided into M regions but merely has N optical fibers 21. In the same manner, the N optical fibers 21 of each input end respectively extend to the N regions of the output end 20.

In this embodiment, the input ends A, B and C correspond to the light sources 11, 12 and 13; the optical fibers 21 of each region in the input ends A, B and C contribute to each region of the output end 20, that is, a great number of light beams are gathered to eliminate the contribution of the illuminance of a sole light beams, thereby improving the entire uniformity of the output light of the output end 20. Further, in the case that the luminance of the light sources 11, 12 and 13 is not uniform (some light sources are especially bright or especially dim), the entire uniformity of the output light of the output end 20 is not severely affected. Moreover, the relative positions of the light sources 11, 12 and 13 do not affect the entire uniformity of the output light of the output end 20 at all. Therefore, the light outputting apparatus 1 of the present invention does not have a high requirement for the setting or adjustment of the light sources 11, 12 and 13, hence improving the convenience of use. Besides, the output end 20 of the light outputting apparatus 1 of the present invention can be dynamically moved to the adjacency to the solar cell module according to a user requirement, so as to reduce the loss of illuminance, thereby being more efficient than the prior art in which the solar cell module is required to be matched with the positions of the light sources.

The above embodiments are merely for the purpose of describing the principles and efficacies of the present invention, but are not intended to limit the present invention. Thus, modifications and variations made by those skilled in the art to the above embodiments without departing from the spirit of the present invention shall fall within the scope of the present invention as specified in the following claims.

What is claimed is:

1. A light outputting apparatus, comprising:
   at least one light source, used for providing light beams;
   a light guiding apparatus, having at least one input end and an output end, wherein the at least one input end corresponds to the at least one light source and comprises a plurality of optical fibers, and the optical fibers of the at least one input end extend to the output end and are distributed uniformly at the output end; and
   a platform, used for bearing a module to be tested, the light beams from the output end illuminating the module to be tested.

2. The light outputting apparatus according to claim 1, wherein the light source is in a stable state or a transient state.

3. The light outputting apparatus according to claim 1, wherein the light source is a gas discharge lamp or a metal discharge lamp.

4. The light outputting apparatus according to claim 1, wherein the input end has N optical fibers, the output end is divided into N regions, and the N optical fibers of the input end respectively extend to the N regions of the output end.

5. The light outputting apparatus according to claim 1, wherein the input end is divided into M regions, each region has N optical fibers, the output end is divided into N regions, and the N optical fibers in each region of the input end respectively extend to the N regions of the output end.

6. The light outputting apparatus according to claim 5, wherein the value of M is equal to the value of N.

7. The light outputting apparatus according to claim 1, wherein each optical fiber has a core part and a cladding part, the cladding part covers the core part, and the refraction index of the cladding part is less than that of the core part.

8. The light outputting apparatus according to claim 7, wherein the material of the core part comprises silicon, and the material of the cladding part is glass or plastic.

9. The light outputting apparatus according to claim 1, wherein the module to be tested is a solar cell module.

* * * * *